(12) United States Patent
S.

(10) Patent No.: US 12,018,727 B2
(45) Date of Patent: Jun. 25, 2024

(54) COLLISION IMPACT REDUCER

(71) Applicant: Dhanya R. S., Trichur (IN)

(72) Inventor: Dhanya R. S., Trichur (IN)

(*) Notice: Subject to any disclaimer, the term of this patent is extended or adjusted under 35 U.S.C. 154(b) by 1251 days.

(21) Appl. No.: 16/616,449

(22) PCT Filed: Nov. 24, 2018

(86) PCT No.: PCT/IB2018/059272
§ 371 (c)(1),
(2) Date: Nov. 22, 2019

(87) PCT Pub. No.: WO2019/102420
PCT Pub. Date: May 31, 2019

(65) Prior Publication Data
US 2020/0173519 A1    Jun. 4, 2020

(30) Foreign Application Priority Data

Nov. 24, 2017 (IN) .............................. 201741018344
Nov. 22, 2018 (IN) .............................. 201741018344

(51) Int. Cl.
*F16F 15/02* (2006.01)
*B62D 21/15* (2006.01)

(52) U.S. Cl.
CPC .......... *F16F 15/022* (2013.01); *B62D 21/152* (2013.01); *B62D 21/157* (2013.01)

(58) Field of Classification Search
CPC ......... B60R 19/24; B60R 19/26; B60R 19/28; B60R 19/285; B60R 19/32; B60R 19/36;
(Continued)

(56) References Cited

U.S. PATENT DOCUMENTS 1,552,965 A * 9/1925 Smith .................... B60R 19/20
                                                293/121
3,588,158 A * 6/1971 Ford ...................... B60R 19/20
                                                267/116
(Continued)

FOREIGN PATENT DOCUMENTS

| CN | 105151016 A | * | 12/2015 |
| CN | 106740609 A | | 5/2017 |

(Continued)

*Primary Examiner* — Joshua E Rodden

(57) ABSTRACT

The invention relates to an Automobile Collision Impact Reducer (ACIR) which can be placed at the front, rear, sides or between the doors of an automobile, having multichambered springs of various strengths which are arranged in different patterns, multi layered plates and/or pipes, along with multi layered cushioning materials which act as a fire suppressant. In-order to reduce the recoil effect after the compression of springs, "Recoil Arrester/Lock system" is introduced, which has recoil arresting box, recoil arresting plate, tension springs and recoil lock lever. This concept can be used in crash guard barriers on roads, culverts, pillars of bridges, walls of houses near the road turns, pillars of metro rail, other railway lines, etc., with certain modifications. During time of collision, after the force transfers from the cushioning materials, there will be multi chambered compression of springs, which helps reduce the force of impact.

37 Claims, 14 Drawing Sheets

(58) Field of Classification Search
CPC ....... B60R 19/44; B60R 19/46; B62D 21/152; B62D 21/155; B62D 21/157; B65G 69/001; B65G 69/008; F16F 15/022
USPC ........................................................ 248/562
See application file for complete search history.

(56) References Cited

U.S. PATENT DOCUMENTS

| | | | | |
|---|---|---|---|---|
| 3,721,433 A * | 3/1973 | Sobel | ................ | B60R 19/18 267/140 |
| 3,747,968 A * | 7/1973 | Hornsby | ................ | B60R 19/20 293/110 |
| 3,785,679 A * | 1/1974 | Peterson | ................ | B60R 19/26 267/140 |
| 3,837,695 A * | 9/1974 | Haase | ................ | B60R 19/20 267/140 |
| 3,841,683 A * | 10/1974 | Toro | ................ | B60R 19/20 293/137 |
| 3,844,544 A * | 10/1974 | Keilholz | ................ | B60R 19/20 267/116 |
| 4,807,915 A * | 2/1989 | Shyi | ................ | B60R 19/36 293/137 |
| 5,106,137 A * | 4/1992 | Curtis | ................ | B60R 19/205 293/109 |
| 5,170,858 A | 12/1992 | Chen | | |
| 5,217,185 A * | 6/1993 | Rucker | ................ | B64G 1/58 89/36.02 |
| 5,332,056 A | 7/1994 | Niibe | | |
| 5,593,195 A * | 1/1997 | Lei | ................ | B60R 19/36 293/30 |
| 5,971,451 A * | 10/1999 | Huang | ................ | B60R 19/18 293/121 |
| 6,050,624 A * | 4/2000 | Kim | ................ | B60R 19/28 293/137 |
| 6,120,871 A * | 9/2000 | De Biase | ................ | B65G 69/001 428/323 |
| 6,217,090 B1 * | 4/2001 | Berzinji | ................ | B60R 19/48 293/106 |
| 7,070,030 B2 * | 7/2006 | Etcheverry | ................ | B60R 21/0428 188/371 |
| 7,097,222 B2 * | 8/2006 | Ran | ................ | B60R 19/28 293/137 |
| 7,503,602 B1 * | 3/2009 | Hinton | ................ | F16F 7/12 296/187.03 |
| 7,753,159 B2 * | 7/2010 | Kim | ................ | B60R 21/36 180/274 |
| 8,181,759 B2 * | 5/2012 | Schmidt | ................ | F16F 15/046 188/371 |
| 8,616,618 B2 | 12/2013 | Nagwanshi et al. | | |
| 9,939,042 B1 * | 4/2018 | Green | ................ | F16F 1/128 |
| 11,453,275 B2 * | 9/2022 | Rampalli | ................ | B60J 5/107 |
| 11,535,182 B2 * | 12/2022 | Baccouche | ................ | B60R 19/48 |
| 11,608,018 B2 * | 3/2023 | Xue | ................ | B60R 19/26 |
| 2005/0102929 A1 * | 5/2005 | Hoffmann | ................ | B65G 69/008 52/173.2 |
| 2007/0152390 A1 * | 7/2007 | DiBiase | ................ | B65G 69/001 267/140 |
| 2010/0300824 A1 * | 12/2010 | Totani | ................ | B60R 19/20 188/376 |
| 2015/0001862 A1 * | 1/2015 | Son | ................ | H01F 7/021 293/120 |
| 2016/0053843 A1 * | 2/2016 | Subhash | ................ | F16F 13/08 267/140.11 |
| 2019/0366961 A1 * | 12/2019 | Chan | ................ | B60R 19/26 |
| 2020/0173519 A1 * | 6/2020 | S. | ................ | F16F 15/022 |

FOREIGN PATENT DOCUMENTS

| | | | | |
|---|---|---|---|---|
| CN | 112193325 A | * | 1/2021 | ......... B60R 13/0861 |
| CN | 112339689 A | * | 2/2021 | ............ B60R 19/18 |
| CN | 112550194 A | * | 3/2021 | ............ B60R 19/02 |
| CN | 213502176 U | * | 6/2021 | |
| CN | 113103982 A | * | 7/2021 | |
| EP | 1310400 A1 | | 5/2013 | |
| WO | WO-8903328 A | * | 4/1989 | ............ B60R 13/00 |

* cited by examiner

COLLISION IMPACT REDUCER

TECHNICAL FIELD OF INVENTION

The present invention relates generally to automobile and motor vehicle safety device, and more specifically to a novel idea of Automobile Collision Impact Reducer (ACIR) with multi-chambered and multi-layered Springs of various strengths with recoil lock system, Plates, Cushioning materials, to absorb and reduce the collision impacts. The same can be used in sides of the vehicle as well as other areas of roads where more probability of collisions takes place like crash barriers, pillars of bridges and railway lines, culverts of bridges, beginning points of road medians etc.

During collision, this device functions as a 'cushion' in between the vehicles or with vehicle and other objects, the device can absorb the force in the collision by way of compression of the constant pitch compression springs in multi-chambers along with plates, pipes etc. and cushioning materials at the extreme front layers. A recoil system comprising of a teethed ended structure having recoil lock system along with a lock having tension spring where the teethed ended structure is attached to the movable outer box and to the inner box which is immovable and a lock which is attached to the inner plate along with a tension spring will lock the recoil after the compression due to collision at the teethed points, depending on the magnitude of the collision.

Apart from this, the same device without the recoil locking system, cushioning materials and air bag sensor system, can be used on the sides of boats, ships, sea-ports, boat-jetties and loading and off-loading areas of god-owns warehouses.

BACK-GROUND OF INVENTION

All over the world, automobile accidents are common. Automobile accident is one of the reasons for causing higher prevalence of mortality and also morbidity ranging from minor injuries to severe injuries and many of them resulting in death. There are Air-bags, which can control/reduce the sudden shocks, present inside of the vehicle, to a great extent. Also there are many inventions related to automatic braking apparatus and emergency braking apparatus. But all these are having their own demerits, mainly its less reliability, difficulty in managing the unforeseen situations, difficulty of using in snowy conditions. One of the major reasons for the high number of death is due to the sudden and hard shock taken place in collision. At present there is no proper and effective device to reduce or harness collision impact in the exterior out-side of the vehicle involved in the road accidents. In this context, the new device can do wonders in this scenario, especially in situation where Light Motor Vehicles, Medium motor vehicles and Heavy vehicles' involved in the accidents.

PRIOR ART

A discussion of the related art of which the present inventor is aware, and its differences and distinctions from the present invention, is provided below.

U.S. Pat. No. 6,217,090 B1 issued on Apr. 17, 2001, titled "Safety Bumpers" describes safety bumper assembly intended to place in front and/or rear of a vehicle having a movable Outer bumper shell, which is affixed to an inner plate with a relatively fixed bumper Support member of the vehicle structure having compression springs but the main disadvantages associated with these and similar patents based on collision impact reductions based on utilizing springs are lack of a recoil arrester of spring without which there will be recoil effect of the springs causing the bouncing back of vehicle, which can lead to a chain of accidents. Also these springs in these patents are not arranged in a multi-layered pattern, if so arranged can further reduce the impact to a greater extent.

European patent No. EP1310400A1 published on May 14, 2003, titled "An Autonomous Emergency Braking Apparatus" comprises of an driver operating accelerator pedal coupled to a braking system and which can control the overall vehicle speed, when a forward detection apparatus detects an imminent contact, there will be automatic application of braking force to the vehicle by the braking system while the vehicle engine speed is reduced.

U.S. Pat. No. 5,170,858AS titled an "Automatic Braking Apparatus With Ultrasonic Detector" comprises an ultrasonic wave emitter which emits ultrasonic waves, an ultrasonic receiver receiving a reflective ultrasonic wave signal which is reflected by another car situated within the pre-determined distance in front of the automatic braking car for actuating a driving motor to intermittently drive a brake master cylinder to boost brake oil towards two wheel cylinders of front and rear wheels to brake the car intermittently for automatically braking the car for a safe braking purpose.

U.S. Pat. No. 5,332,056 issued on Jul. 26, 1994, titled "Automatic Braking System For Motor Vehicle" comprises of sensors for sensing the distance and a relative speed between the vehicle and an obstacle in front of the vehicle, judging device which can assess an alarm sounding region and a region in which the vehicle has a possibility of contact with the obstacle and vacuum booster etc.

The recent prior arts related to automatic braking system and other similar patents related to automatic braking system cannot be used where roads where turns and curvatures are more and where there are country roads, in snowy conditions etc and also in unforeseen situations. Also all these systems necessitate that the driver should have a thorough knowledge regarding the mechanism and use. Failures due to the failure of sensing devices etc are more frequent and needs frequent monitoring and reliability of these devices is less compared to mechanical devices. Moreover 100 percent prevention is not guaranteed. Thus a collision impact reducer with multilayered springs, plates cushioning materials and recoil lock system is introduced which can be incorporated for reducing the impact of collision to a greater extent along with negligible bouncing back effect and also is less expensive compared to these. Moreover the present system can be used in crash barriers in the roads, culverts and pillars of bridges, walls of houses near the road turns, pillars of metro rail, boat jetties, boats and other railway lines with mild modifications, where ever there is a high probability of colliding vehicles, in order to reduce the impacts. Also many of the systems used for reducing the impact/for avoiding collision may be hindering the proper functioning of air bags. Here a process of fixing the crash sensor inside the device for ensuring the unhindered and smooth functioning of air bag is also described. Most of the devices are designed for front and rear side collisions of a vehicle, but the device which is introduced here can also be modified according to safety plan for utilization on the sides and doors of a vehicle.

STATEMENT OF INVENTION

The present invention relates to a novel idea of Automobile Collision Impact Reducer (ACIR) with multi-chambered and multi-layered Springs of various strengths, Plates, multi-layers of cushioning materials and with recoil lock system, to absorb and reduce the collision impacts, but the same can be used in sides of the vehicle as well as other areas of roads where more probability of collisions to be takes place like crash barriers, pillars of bridges and railway lines, culverts of bridges, beginning points of road medians etc.

This device functions as a 'cushion' in between the vehicles during an automobile collision, by the support of the springs, which can absorb the force in the collision by way of compression of the springs, and cushioning materials at the extreme front layers. Multilayered cushioning materials are also introduced here which consists of layer of thermocol below durable material like shock absorbing rubber sheet. Rubber sheet can be replaced with sorbothane sheet which is more shock absorbing, but is more expensive. A layer of multiple bags are also introduced here which is placed at the extreme front region placed above the shock absorbing rubber sheet, which are placed near to each other, without any direct attachment, each bag comprising horizontally separated 2 chambers-one chamber filled with water placed in the upper portion which has a splashing effect to reduce the temperature of collision and also as fire suppressant and another chamber placed in the lower portion filled with nitrogen gas for compressive effect, cushioning effect, fire suppressant and reducing the weight. During the time of collision, after the force transfers from the cushioning materials, there will be multichambered compression of springs depending on its stiffness which helps to reduce the impact to a great extent. In-order to reduce the recoil effect after the compression of springs, here "Recoil Arrester/Lock system" is introduced having recoil arresting box, recoil arresting plate, tension springs and recoil lock lever. Apart from this, the same device without the recoil locking system and bags at extreme outer layer, can be used on the sides of boats, ships, sea-ports, boat-jetties and loading and off-loading areas of god-owns warehouses.

Now, the invention is clear from the following description. The nature of the invention and the manner in which it has to be performed is clearly and fully described in the following description.

DETAILED DESCRIPTION OF THE INVENTION

Disclosed here is a novel invention comprising of an Automobile Collision Impact Reducer (ACIR) which will fix directly to the chassis of the vehicle at the front and rear end, proportional to the width of the vehicle depending on the safety plan. It can also be placed between the sides and doors of an automobile depending on the safety plan. The device comprises of multi chambered springs of various strengths which can be arranged in different patterns, multilayered plates, pipes and multilayered cushioning materials acting also as fire suppressant. In-order to reduce the recoil effect after the compression of springs, "Recoil Arrester/Lock/locking/Arresting system" is introduced having recoil arresting/arrester/lock box, recoil arrestor/arresting/locking plate, tension springs and recoil lock/arrester/arresting lever, releasing knob. This device can reduce the impact of automobile's collisions to a great extent and also with slight modifications can be used in roads, culverts and pillars of bridges, walls of houses near the road turns, pillars of metro rail and other railway lines with mild modifications, where ever there is a high probability of colliding vehicles.

Length of the Automobile Collision Impact Reducer should be equal to the width of the vehicle at front/rear. Automobile Collision Impact Reducer consists of 2 outer cases which comprises the whole components except the multilayered cushioning materials in which first outer case is encased within the 2nd outer case. The first outer case which is in the inner most part of a vehicle can be considered as inner box/case/shell and the second outer case within which the first outer case is encased situated in the outer portion of the vehicle can be considered as outer box/case/shell. This classification is made based on purpose and convenience. So now there are 2 cases/boxes, one inner box/case/shell and another outer box/case/shell comprising of all components of ACIR except multilayered cushioning materials which is described below as the first and second major embodiments respectively. All other embodiments are also described here.

The first major embodiment in this Automobile Collision Impact Reducer as shown in FIGS. 1, 3, 4, 5, 6, 7, 8, 11 and 12 is immovable metallic inner box 1, encased partly into the second embodiment metallic outer box 2, firmly attaching to the chassis C of the vehicle, to which is attached all the metallic springs 6 in the inner chamber, inner pipes 13. The recoil arresting plate 7 passes through this. This embodiment will support to compress the device during collision. The inner side/face of this box 1 parallel to the middle plates 3 can act as inner-most plate. Box has to be made of steel to ensure that it can withstand sufficient stresses during compression. All these arrangements support the compression of the device during collision. The inner box 1 is attached to the chassis by means of angle plates 14.

One of the outer face of this embodiment, where chassis is attached is also attached with the recoil locking box 11. The lock releasing knob 10 is placed on top of this box.

The second major embodiment in this apparatus as shown in FIGS. 1, 3, 4, 5, 6, 7, 8, 9, 11, 12 is movable metallic outer box 2 to which all the metallic springs in the outermost chamber, outer pipes 12 and recoil lock system gets attached and will support to compress the device during collision. The inner side/face of the outer box 2 parallel to the middle plates 3 can act as outer-most plate. Box has to be made of steel to ensure that it can withstand sufficient stresses during compression. Outer side/face of the outer box 2 which is parallel to the middle plates 3 is attached to the multilayered cushioning materials; all these arrangements support the compression of the device during collision. The crash sensor 18 is attached to one of the inner faces of outer box 2. The wire 19 of crash sensor 18, placed at the bottom of outer pipe 12, will pass through outer pipes 12, inner pipes 13 and inner box 1 and then to the control unit of air bag system. This arrangement is made for ensuring the unhindered and smooth functioning of air bag. This inner box/case 1 along with the outer box/case 2 together holds all the components of the device except first and second major embodiments.

The third embodiment in this ACIR as shown in FIGS. 1, 5, 6, 7, 8, 11, and 12 comprises of plates viz middle plates 3 along with outer box 2 and inner box 1 separating the device into different chambers vertically. Each unit comprising identical springs of same strength, portion of pipe/pipes 12 and 13 and portion of recoil arresting plates 7 can be considered as a chamber. Inside the metallic boxes 1 and 2, if there are 'x' chambers, there will be (x−1) layer of linear plates along with outer 2 and inner box 1 in vertical position. Middle plates 3 arranged perpendicular to the springs 4, 5 and 6 and parallel to the outer box 2 and divides the device into separate chambers to help in stabilization. Both faces of the middle plates 3 are connected with the both ends of all the constant pitch compression springs in middle chambers;

one end of all the constant pitch compression springs 4 in inner most and outer most chambers 6 are connected to middle plates 3 and other end connected to inner most box 1 and outer most box 2 respectively; plates 2 arranged vertically perpendicular to spring. All these arrangements are made for ensuring the uniform compression of springs in the right direction. For stabilizing the springs 4, 5 and 6 and middle plates 3 within the chambers, there will be outer pipes 12, inner pipes 13 and recoil locking plates 7.

The Fourth embodiment in this ACIR as shown in FIGS. 1, 4, 5, 6, 7 & 9 comprises of constant pitch compression springs of differing strengths and thicknesses which can be classified based on thickness and strengths into low stiff (soft) 4, medium stiff(medium hard) 5 and high stiff(hard) 6 which are placed in different chambers in a horizontal manner; inner most chamber springs fixing to inner box 1 and middle plate 3; middle chambered springs fixing to middle plates 3 and outer most chambered springs fixing to outer box 2 and middle plate 3. It will be arranged in the direction of movement of the vehicle in order to compress the springs in the same direction during collision to minimize or reduce the impact of collision. The plates 3 in the chamber along with the outer box 2 and inner box 1 will support in uniform compression of springs within the chamber. In case of progressive arrangement of springs having a 3 chambered device, during collision the first impact will be received in the cushioning materials After that, the impact will get reduced before transferring to the outer chamber (chamber 1) having low stiff springs 4 which then compress, the remaining reduced force will be transferred to 2nd chamber having medium stiff springs 5 followed by compression and with subsequent transferring of the reduced remaining force to the inner(3rd) chamber having high stiff (stiff) springs 6 and its compression. The whole unit comprising of chambers will attain the complete compression after several similar steps involving the same sequence of waves like compression with lesser compression force in each time. This in turn will increase the time gap to attain the complete compression of the entire device compared to single chambered device, thereby reducing the impact in a better way.

During collision in symmetric arrangement of springs, the impact will get transferred from cushioning materials to the outer chamber(chamber 1) having low stiff springs and it then compress, the remaining reduced force will be transferred to 2nd chamber having high stiff springs 6 but it does not compress. It will transfer the remaining reduced force to the inner (3rd) chamber having low stiff springs 4 and it then compress and this chamber no 3 will transfer the force to chamber no 2 and high stiff springs in chamber no 2 will be compressed. Ist time no chamber will attain the complete compression. Then the whole unit comprising of chambers will attain the complete compression after several similar steps involving the same sequence of compression with lesser compressive force in each time. The shifting of force from one chamber to another chamber takes more time in symmetrical pattern than progressive pattern which will increase the time gap to attain the complete compression of the entire device compared to progressive pattern increasing the efficiency thereby reducing the impact to a great extent.

The fifth major embodiment in this ACIR as shown in FIG. 1 where, the pipes have been separated into inner 13 and outer pipes 12, so as to facilitate the smooth compression of springs. One outer pipe 12 and one inner pipe 13 forms a pair; such pairs are utilized for the stabilization of the springs 4, 5, & 6 and middle plates 3 and attached to the outer box 1 and inner box 2 by means of attachment plates. Each outer/inner pipe is bound by a spring if possible inorder to gain space based on the inner diameter of the spring and outer diameter of the pipe. The length of the outer pipe/inner pipe is made almost the same as the width of Automobile Collision Impact Reducer excluding width/thickness of the multilayered cushioning materials during its maximum compression. The maximum compression means the maximum attainable compression of a spring without undergoing permanent deformation of springs. The inner 13 and outer pipe 12 pairs are arranged parallel to springs and perpendicular to plates and outer and inner boxes; outer pipe 12 and inner pipe 13 both equal in length, attached to the outer box 2 and inner box 1 respectively by means of attachment plates for stabilization of the springs and plates; where a small portion of inner pipes 13 rest inside outer pipes 12 during normal position and inner pipe 12 is made to move inside of the outer pipe, during compression of the springs when collision occurs so as to act as guiding component to facilitate the smooth compression of springs.

The Outer pipe 12 which is placed for stabilization of the apparatus should be equal to inner pipe 13, 3 pairs of pipes 12 and 13 should be there for 3 chambered apparatus and If the number of chambers are increased especially in the situation of heavy vehicles, where more space is available to incorporate 5/7/more chambered apparatus and more load can be taken, the pipe pair sets have to be increased accordingly. The distance between 1st and 2nd pipes, between 2nd and 3rd pipes in a single chamber in a 3 chambered device should be made equal with identical 3 outer pipes and identical 3 inner pipes, likewise in multi chambered device greater than 3 chambers, more number of identical outer and inner pipes have to be installed with this same pattern. This arrangement along with identical springs 4, 5 and 6 of same strengths and thicknesses have to be placed in a single chamber in single or multiple layers with all layers in a single chamber having the same number of springs with uniform spacing; the recoil arresting plate 7 should be placed in between the pipes 12 and 13, the distance between first recoil arresting plates and second plate and second and third recoil arresting pates should be almost equal with 3 identical recoil arresting plates 7 in a 3 chambered device; so if describing from one end to another end of a chamber, on the extreme end there should be pipe pair, then springs 4, 5 and 6, then recoil locking plate 7, all these arrangements described above forming a minor imaged pattern when seen from the middle point, which will help in achieving maximum stabilization of springs, plates and also in achieving the equal distribution of forces which enhances the efficiency of the device.

The crash sensors 18 is placed at the bottom of outer pipe 12 at the inside of the outer box 2 and the wires 19 of crash sensor will pass through the outer pipe 12, then to inner pipe 13 and then through the inner box 1, then to the control unit of air-bag for ensuring the unhindered and smooth functioning of air bag.

The Sixth embodiment as shown in FIGS. 1, 3, 4, 5, 6, and more completely and specifically depicted in FIG. 7, FIG. 8 comprises of Recoil Locking System of ACIR consisting of immovable part mainly the recoil locking box 11 and movable part mainly the Recoil arrester plate 7. Recoil locking box 11 of recoil locking system is attached to the one of the outer face of this inner box 1 where chassis is also attached, while the Recoil arrester 7 is fixed with the inner side/face of the outer box 2. The movable part recoil locking plate 7 is a teethed structure in its upper portion leading towards inner box 1, which is passing through the middle plates 3 and Inner-box 1. In the recoil locking box 11, there is a knife-like structure, which is the 'Recoil locking lever' 8, in which one end is fixed in a nut and has free tilting movement. The other end of the 'Recoil locking lever' 8 is connected with tension spring 9 always pulling it downwards and a releasing knob 10 at the top of recoil locking box 11, which is attached at the recoil locking box 11. Only a portion of the recoil arrester plate 7 is teethed, as the top portion of the structure fixed to outer box will be made plane so as to guide the recoil arrester plate 7 into the recoil locking lever 8. The length of the plane structure of the recoil arrester plate 7 should be equal to the length of the outer pipe 12 or inner pipe 13 or should be equal to the width of Automobile collision impact reducer during maximum compression excluding the width of multilayered cushioning materials so as to get the recoil structure locked after allowing for maximum compression during collision. Recoil locking plate 7 along with outer pipe 12, inner pipe 13 stabilizes the springs 4, 5, 6 and middle plates 3 within the chambers.

The seventh major embodiment in this ACIR comprised of layers of cushioning materials consisting of a layer of thermocol (Polystyrene) 17 with another layer of durable material like shock absorbing rubber sheet 16 as shown in FIG. 9 and a small portion in FIGS. 1, 3, 4, 5, 6 placed on the front side/face of the outer box 2 covering the entire width of the device with a small portion extending sideways to absorb a greater portion of shock due to impact of collision after being transferred from the cushioning materials like bags 15. Shock absorbing rubber sheet can be replaced with Sorbothane sheet which is more impact/shock absorbing but more expensive.

The eighth major embodiment in this device as shown in FIG. 1, 3, 4, 5, 6 and more completely and specifically depicted in FIGS. 9, 10 may be cushioning materials comprising of multiple specially made rubber bags 15, which are placed near to each other without any attachment; number of bags depending on the width of the vehicle/length of the device placed on the extreme outermost portion of the device, a small portion also extending sideways, each consisting of horizontally separated 2 chambers; one chamber 15b filled with water placed in the upper portion which has a splashing effect and cushioning effect to reduce the temperature of collision and also as fire suppressant and another chamber 15c filled with air/nitrogen gas in the lower portion for compressive effect, cushioning effect, fire suppressant and reducing the weight in order to decrease the impact of shock at the event of collision. A plastic overlay can be placed on this layer of multiple bags for esthetic and aerodynamic purposes.

The bags are placed on the extreme outermost portion of the device. The bags covers the entire length of the device, which are placed near to each other, without any direct attachment, as a single layer as shown clearly in FIG. 9, 10 and a small part of it is shown in FIG. 1, 3, 4, 5, 6. This is mainly done to facilitate the easier replacement of one or 2 bags damaged in the event without having to replace the entire bag.

As shown in FIG. 9 and FIG. 10, cushioning materials like multiple bags are fixed by using adhesive material to a layer of thermocol with a layer of rubber sheet and the bags 15 have 2 wings 15a, using which it can be fixed in the bottom and top side of the outer box 2 using nuts and bolts through hole 15d. The inner layers of cushioning materials sandwiched between outer-box/case/shell 2 and Nitrogen-water bags, the bags also giving a packing effect to the inner layers of cushioning materials.

When collision takes place, firstly the bags 15 of the cushioning materials containing water 15b and Nitrogen 15c will break due to the impact of collision. Here both the water chambers and Nitrogen chambers absorbs a good quantity of impact during collision and as a result of which the chambers of the bags bursts. The remaining force will get transferred to the other layers of cushioning materials 16 & 17 and the rest will be transferred to the chambers of ACIR. The water in the chamber 15b will work as a cushioning material and also will help to reduce the temperature of collision as well as a fire suppressant. Nitrogen, filled in the lower chamber is utilized for gaining compressive effect and cushioning effect to reduce the impact of shock at the event of collision. If the entire bag is filled with water it can increase the weight of the entire device. So Nitrogen placed in the lower chamber can also reduce the weight of the ACIR. The water chamber is placed in the upper portion in order to function properly for suppressing fire and reducing heat and also produce a splashing effect.

The eighth embodiment 15 is attached to seventh embodiment 16 & 17 and 2nd embodiment outer box through the rubber wings (15a) extending from the bags 15.

Principle Behind Working of Automobile Collision Impact Reducer

A moving vehicle have kinetic energy. Depending on the size/weight and speed of the vehicle, the kinetic energy will vary. A vehicle having high speed have higher kinetic energy than the same vehicle in low speed. During collision, the majority of the kinetic energy of the vehicle will be converted to mechanical work, there by causing damages to the vehicles and other properties.

During collision, the mechanical work is the damages happened to the vehicle.

When, a collision takes place to a vehicle having Automobile Collision Impact Reducer from a vehicle, a large quantum of kinetic energy is converted to mechanical work on the springs of Automobile Collision Impact Reducer to compress it. Once the compression is completed, at the same moment the compression is locked by the recoil locking system, in order to prevent the recoil of the springs and the same energy will be stored in the springs in the form of potential energy, which will be released later by lifting the releasing knob. Ultimately, the device Automobile Collision Impact Reducer with Spring, Plate and Cushioning Materials, absorbing and reducing the Kinetic Energy of the colliding vehicle/s, thereby reducing the damages due to collision. The remaining energy will be transferred to the vehicle.

Capacity of ACIR

The load/force bearing capacity of each chamber's of ACIR will be vary.

In progressive type ACIR all chambers are variable.

In symmetrical type ACIR, there will be single/multiple pair of chambers which are in equal strength, except the central chamber, which has got the highest stiffness/strength.

Load bearing capacity of an automobile collision impact reducer depends on the components of cushioning materials. That is it depends on the load bearing capacity of a layer of nitrogen water bags, load bearing capacity of a layer of thermocol and load bearing capacity of a layer of shock absorbing rubber sheet/sorbothane sheet. Further the load bearing capacity of a device also depends on the load bearing capacity of the outer box and inner box depending on the quality of the metal and thickness of the boxes. Again, the load bearing capacity of a device also depends on the load bearing capacity of identical springs of each chamber which is dependent on the strength and thickness, rate of a spring etc. If the number of springs/number of layers of a chamber is increased it can increase the load bearing capacity of the entire chamber. Further, the load bearing capacity of a device will depend on the thickness of metallic plate (middle plates), the strengths of metallic plates, also on thickness and strengths of recoil arresting plate etc.

Load bearing capacity of a spring=Rate of spring multiplied by the distance travelled by the spring during compression.

Width of the device=width/thickness of the layer of nitrogen water bags+width/thickness of the layer of shock absorbing rubber sheet/sorbothane sheet+width/thickness of the layer of thermocol+thickness of the outer box+thickness of the inner box+free length of one of the identical spring (spring) in first chamber+free length of one of the identical spring in second chamber+free length of one of the identical spring in third chamber++free length of one of the identical spring in nth chamber+thickness of the 1st middle plate+thickness of the 2nd middle plate++thickness of the (n−1) th middle plate.

If there are 'n' chambers in a device, there will be n−1 middle plates.

Types of ACIR

A. Based on Strength of Springs
1. Single chambered less efficiency as only one chamber of springs having same strength can be introduced. So the compressive forces cannot be transferred to the next chamber to reduce the effect of collision.
2. Multichambered springs of same strength.
3. Multichambered arrangement of springs of variable strengths in progressive manner from out side to inside. (low stiff compression springs at the outer chamber (chamber no 1), medium stiff springs in the middle chamber and high stiff compression springs at inner chamber). As described in FIG. 1, 3, 4, 5, 6, 7, 8 in case of 3 chambered device, in FIG. 11 in case of 5 chambered device
4. Multichambered arrangement of springs of variable strengths in symmetrical manner in both directions with high stiff compression springs in the middle chamber (no 2), and soft compression springs in the outer chamber and inner chamber(no 1 and 3), in FIG. 12 in case of 5 chambered device.

Multichambered arrangement of variable strengths in progressive manner from out side to inside and multichambered arrangement of variable strengths in both directions in symmetrical manner are the most effective ACIRS and among these the symmetrical type is more efficient.

B. Based on the Number of Chambers of Springs
1. 3, 5, 7-chambers in the case of Symmetrical type.
2. 3, 4, 5, 6, 7-chambers in the case of springs of progressive type (The number of chambers of compression springs denoted by 'x'.).

Various Modifications of Automobile Collision Impact Reducer
1. Depending on the size of the vehicle and space available for fixing the impact reducer and also on the safety plan, the number of chambers can be increased to 7 or 9, When number of chambers increased, there will be better possibility to reduce the impact to a great extent in heavy vehicles.
2. When collision takes place between 2 vehicles having the collision impact reducer, the impact also can be reduced to a great extent, in the sense that, the 2 vehicles with 5 chambers, impact of collision can be reduced to a great extent.
3. The height of collision Impact Reducer can be varied from 15 Cms to 50 Cm, depending on the size of vehicles where it is going to be used. In Light Motor Vehicles, the height of 15 to 20 Cm can be made, where as in Medium and Heavy Vehicles 30 to 50 Cm can be made.
4. Depending on the height of the device, the no. of horizontal layers(rows) of springs also will be increased. At the same time, height of the plates will also increase. Diameter of the pipes will also increase. In height with 10 & 20 cms there can be only one row of horizontal layer/row, where as in height with 30, 40 and 50 cms will have 2 rows. eg, in a device with 10 cms height, there will be single row of springs, where as in height with 20 cms have 2 rows, 30 cms have 3 rows, 40 cms have 4 rows and 50 cms have 5 rows.
5. When a collision takes place between the vehicles, where both having the device, the damages will be lesser or negligible to both vehicles. At the same time, a collision takes place between the vehicles, in which 1 having the device and the 2nd doesn't have the device, the damages will be lesser or negligible to the 1st vehicle and more damages to the 2nd vehicle, but the damages to the 2nd vehicle is lesser, when compared to the situation where same collision takes place between 2 vehicles where both vehicles doesn't have the device.
6. The device with/without recoil locker and without crash bag sensors—can be used as crash barriers in the soft walls of highway sides and pillars of bridges and walls of under-passages.

Various Practical Situations of AICR
1. Both vehicles have ACIR of equal strength: Damages will be lowest to both vehicles.
2. Both vehicles have no ACIR: Damages will be highest to both vehicles.
3. Both vehicles have ACIR of different strength: ACIR having higher strength will get less damage and ACIR having lower strength will get higher damage, but both situations are better than vehicles without ACIR.
4. One vehicle have ACIR and other doesn't have: Vehicle with ACIR will get less damage and vehicle doesn't have ACIR will get more damage, but both situations are better than vehicles without ACIR.

Variants of ACIR

Multi unit of mini Automobile Collision Impact Reducer can be made, each unit containing one pipe pair, less number of springs, one recoil locking system so that if damages happens to one unit, it can be replaced easily without replacing the entire multi unit.

BRIEF DESCRIPTION OF THE FIGURES

In figures, the same reference numeral and letters indicates the same components.

DETAILED DESCRIPTION OF FIGURES

Figure 1:
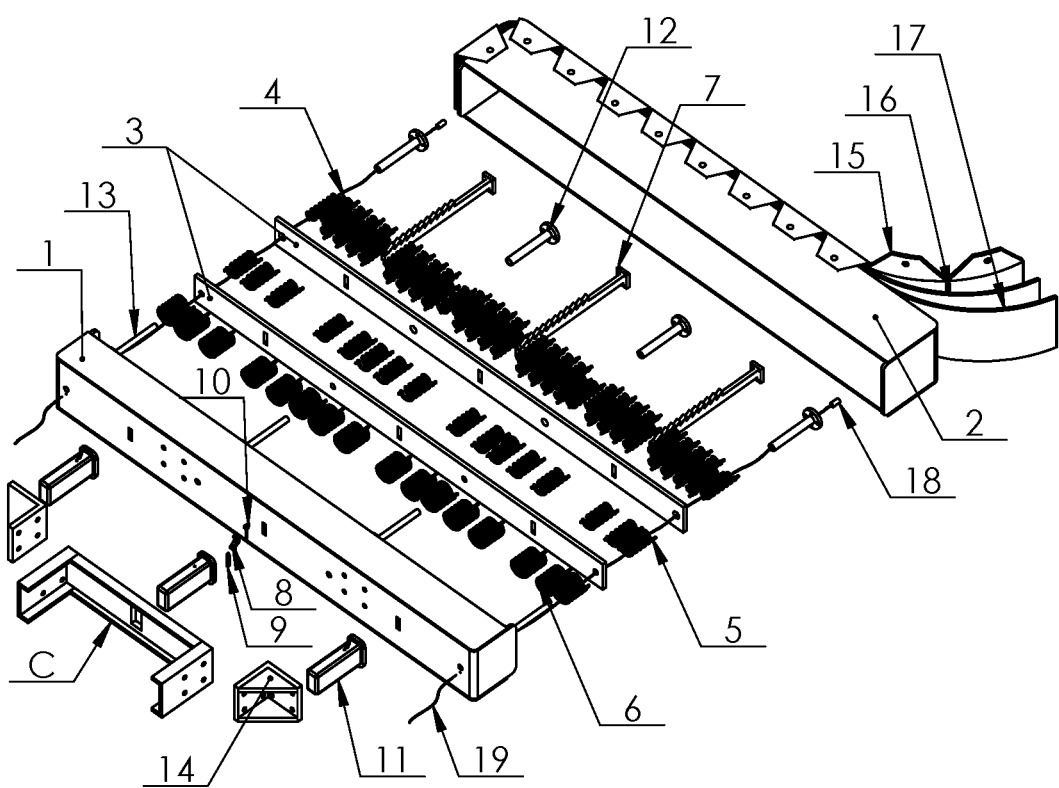
FIG. 1 is an exploded perspective view of the embodiment of an Automobile Collision Impact Reducer (ACIR), showing its various components having 3 chambers.

FIG. 1 showing the exploded view of several components has already been described along with the description of embodiments above.

Figure 2:
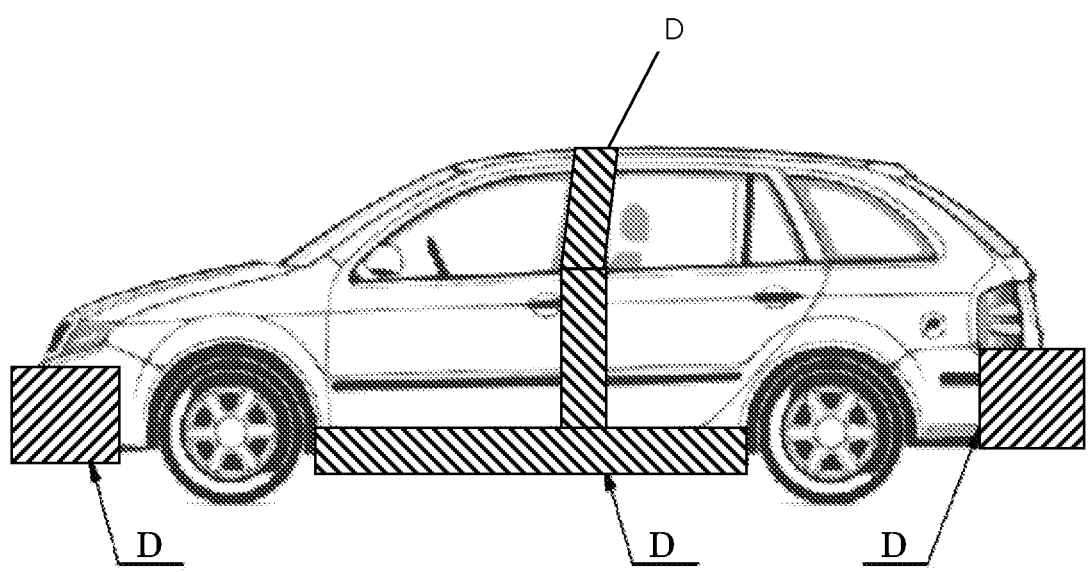
FIG. 2. Position of Automobile Collision Impact Reducer in a Car.

As shown in FIG. 2. The striped portion which covers continuously the entire width of vehicle indicates the length of device. The device D will fix at the front and rear end of the vehicle, fixing directly in the chassis C of the vehicle, proportional to the width of the vehicle. This device D needs to be projected out-wards at the front and rear portion, minimum 10 cms to 50 cms. This device D can also be fitted in sides of a vehicle especially in doors to prevent collision from sides. This will be placed in the junction between the 2 doors on both sides and also in the lower portion of each door separately on both sides. Further it can be placed any where based on the space available. Moreover, then same can be fixed both horizontally and vertically depending on the safety plan. This device D can be fitted in medium and heavy vehicles of any categories by changing the number of chambers accordingly.

Figure 3:
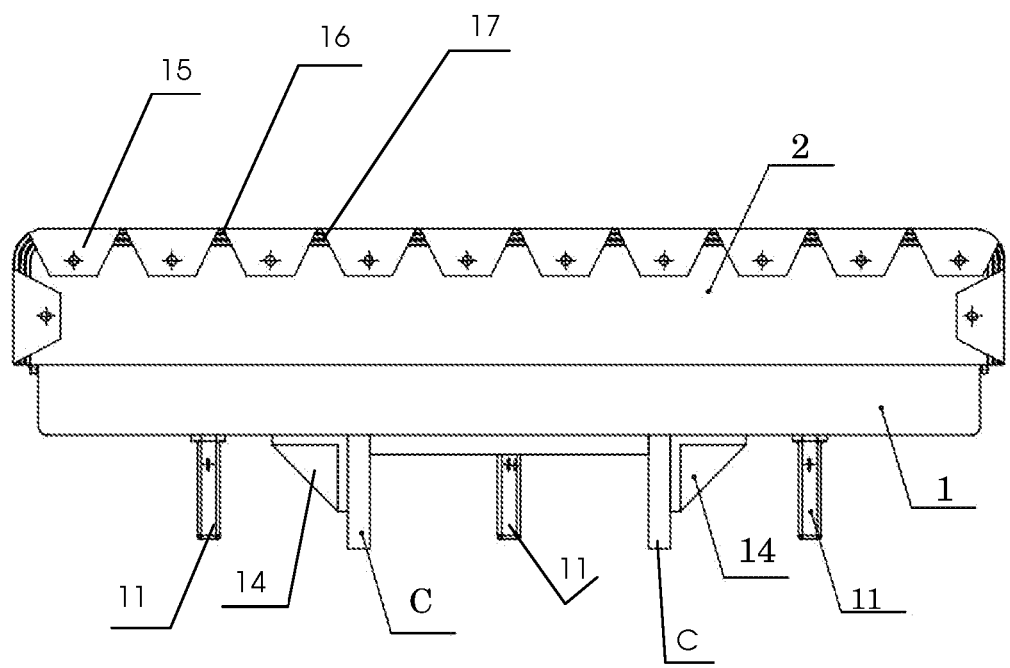
FIG. 3. Top view of Automobile Collision Impact Reducer in normal position.

As shown in FIG. 3, during normal positions it looks like a rectangular/square box and small portions of the 'Recoil-locker' can be seen outside of the inner box.

Figure 4:
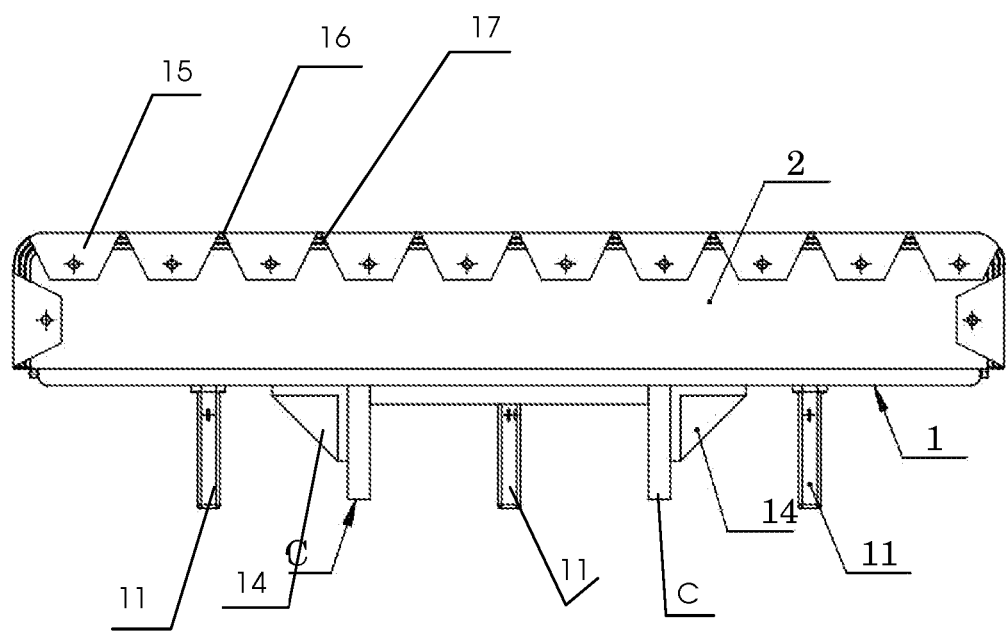
FIG. 4. Top view of Automobile Collision Impact Reducer in compressed position.

As shown in FIG. 4, due to the compression of springs 4, 5, 6, the outer box 2 gets compressed. There are no other changes in its out-look during its compression except the possibility of damages in cushioning materials.

Figure 5:
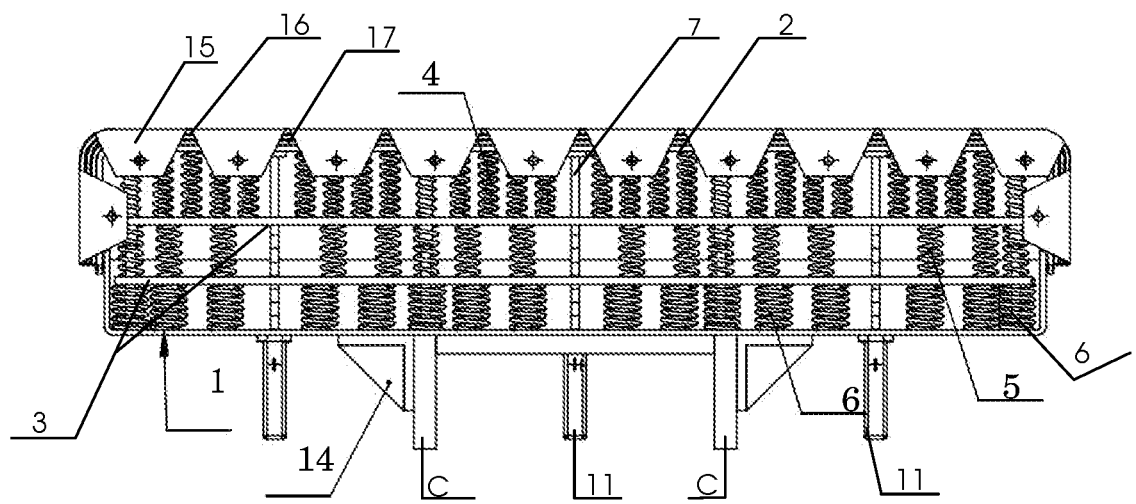
FIG. 5. Top section view of view of Automobile Collision Impact Reducer in normal position.

As shown in FIG. 5, showing the components in the normal position which has been described in detail in the embodiments.

Figure 6:
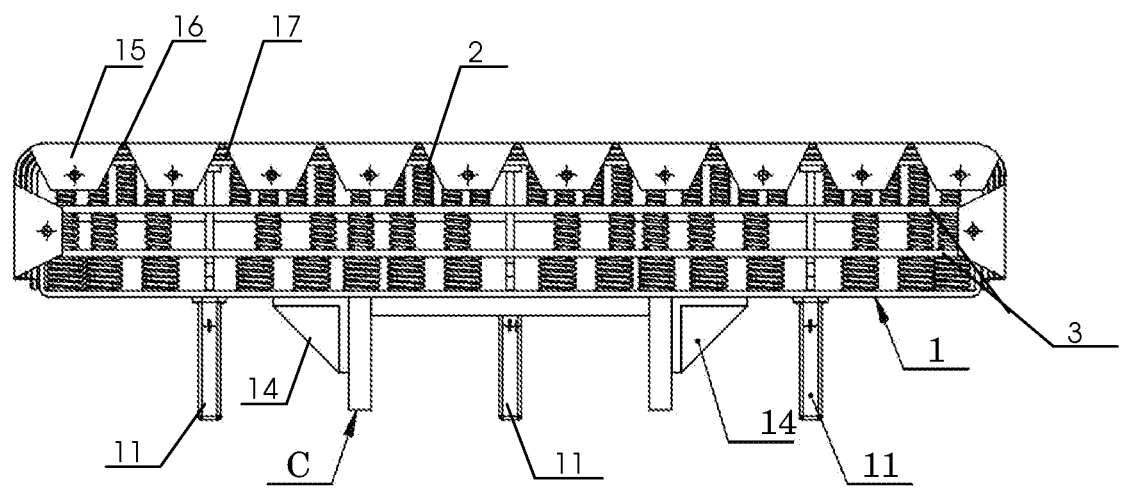
FIG. 6. Top section view of view of Automobile Collision Impact Reducer in compressed position.

As shown in FIG. 6, when a collision/impact occur it can compress the springs in various chambers. Here in this case of 3 chambered device, in case of progressive arrangement of springs, the spring in the outer chamber having low stiff springs 4 will compress First and then followed by chamber No. 2 having medium stiff springs 5, then chamber No. 3 having high stiff springs 6. The springs will be compressed along with it inner pipe 13 will be moving inside the outer pipe 12 and the overall length of the inner 12 and outer pipe 13 pairs get reduced depending on the magnitude of compression. The length of the outer/inner pipe is made as same as the total width of the device excluding the width of the multilayered cushioning materials. When it compress to the maximum. Moreover, at the same time, due to the compression, 'Recoil-Locking plate' 7 can come out to the outer portion of the inner box and it gets locked into the metallic locking lever 8 after compression to prevent the recoil effect of springs 4, 5, and 6.

Figure 7:
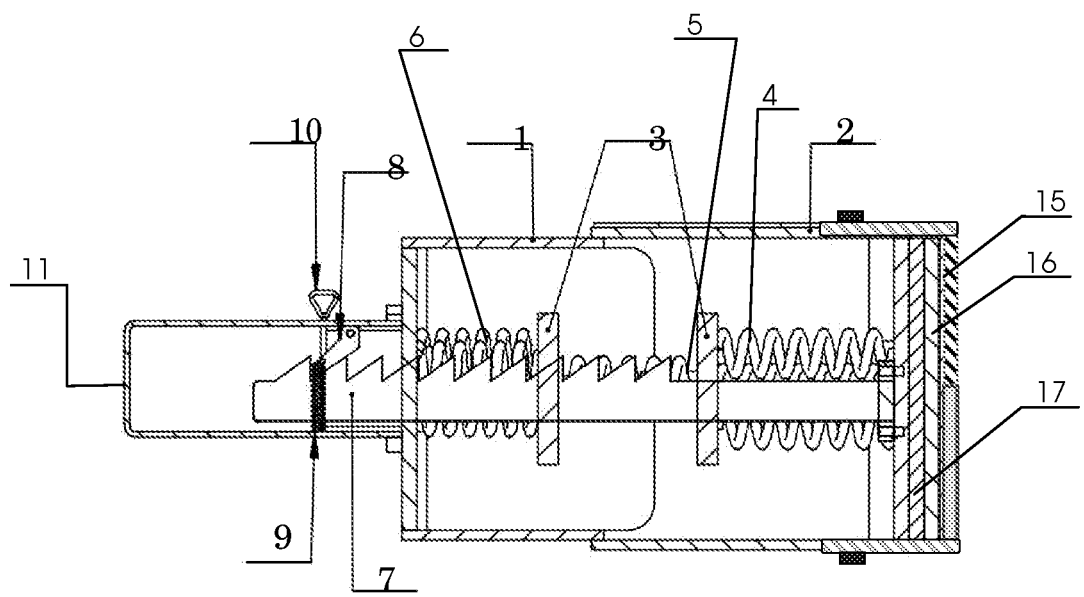
FIG. 7. Side section view of Recoil Locking system in normal position.

FIG. 7 showing the recoil locking system in section view has already been described along with the brief description of embodiments.

Figure 8:
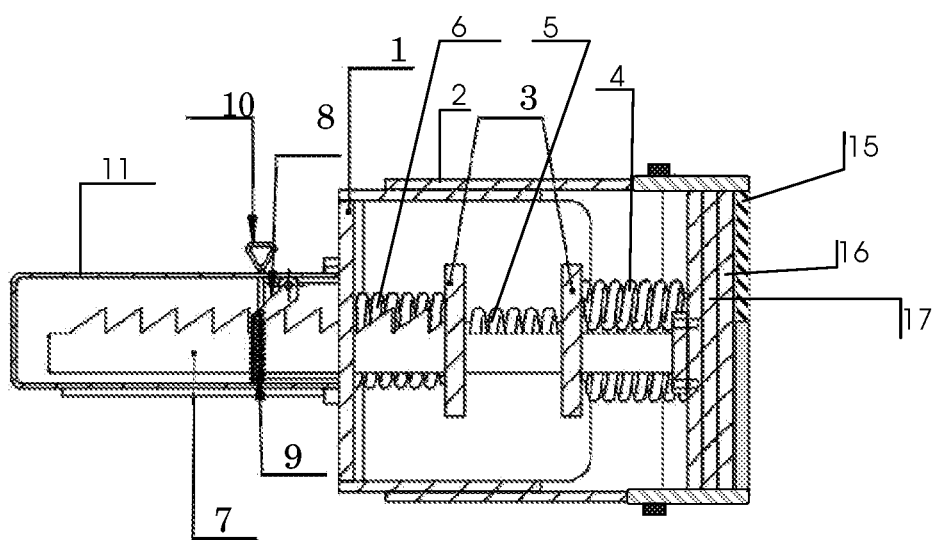
FIG. 8. Side section view of Recoil Locking system in compressed position.

As shown in FIG. 8, during compression of springs due to collision, the re-coil locking plate passing through the inner plate fixed to outer plate will come out through inner plate and metallic recoil locking lever which is attached to the inner plate along with a tension spring pulling downwards will automatically lock the recoil arresting plate and arrest the recoil after the compression due to collision at the teethed points, depending on the magnitude of the collision; the locked position can be released manually later by lifting the knob.

When collision takes place, the outer box 2 will compress inwards and causes compression of springs and the 'locking lever' 8 which is attached to a tension spring 9, will pass through the teethed structure of recoil arrester plate 7 and will lock once the compression ceases. Later, the compression can be released at any time, by just pulling the 'Releasing hook/knob' 10. Later, the compression can be released at any time, by just pulling the 'Releasing hook/knob' 10. There is also the possibility of damages in cushioning materials.

Figure 9:
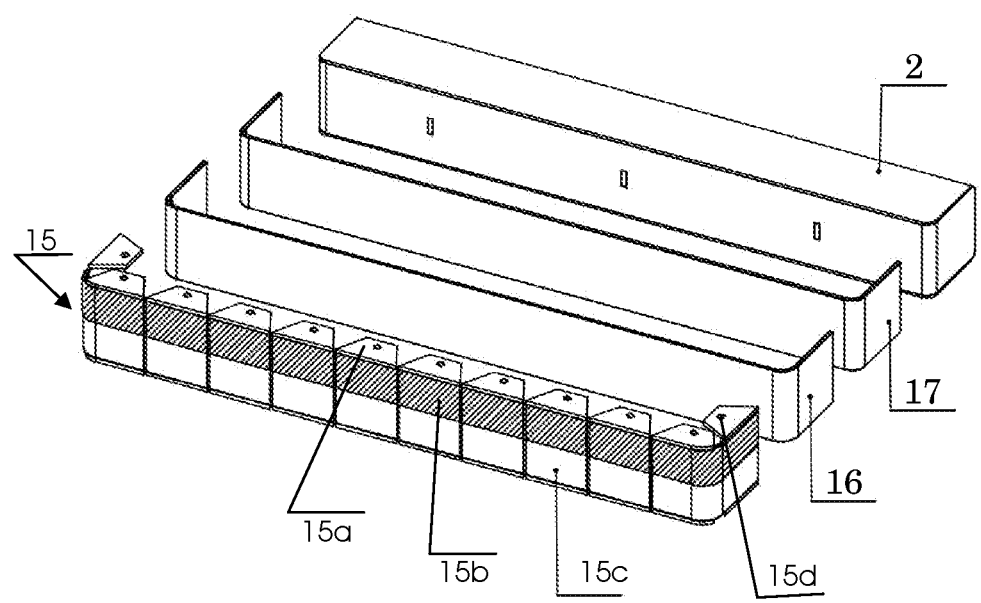
FIG. 9. Exploded view of the layers of cushioning materials.

As shown in FIG. 9 showing the details of the layers of cushioning materials, the Cushioning materials comprising of multiple bags made of rubber as explained in eighth major embodiment, below which, a layer of rubber sheet 16 which lines cushioning materials like thermocol (Polystyrene) 17 as explained in the seventh major embodiment, all these attached to 2nd major embodiment outer metallic box 2.

Figure 10:
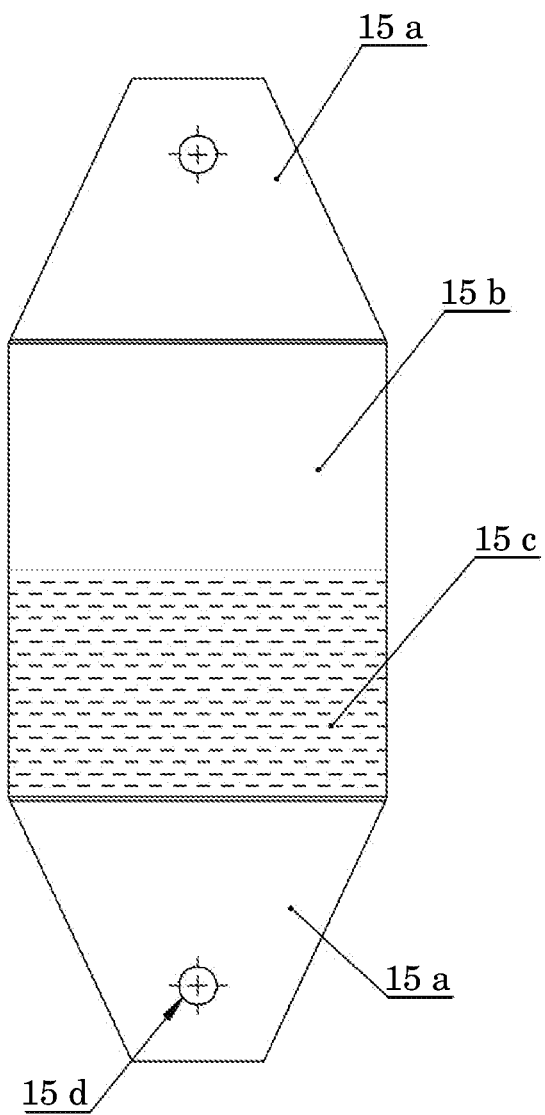
FIG. 10. Exploded view of the Nitrogen-water bag.

As shown in FIG. 10, each Nitrogen water bag consisting of horizontally separated 2 chambers; one chamber 15$b$ filled with water placed in the upper portion and another chamber 15$c$ filled with nitrogen gas in the lower portion, the bag 15 have 2 wings 15$a$, using which it can be fixed in the bottom and top side of the outer box 2 using nuts and bolts through hole 15$d$.

Figure 11:
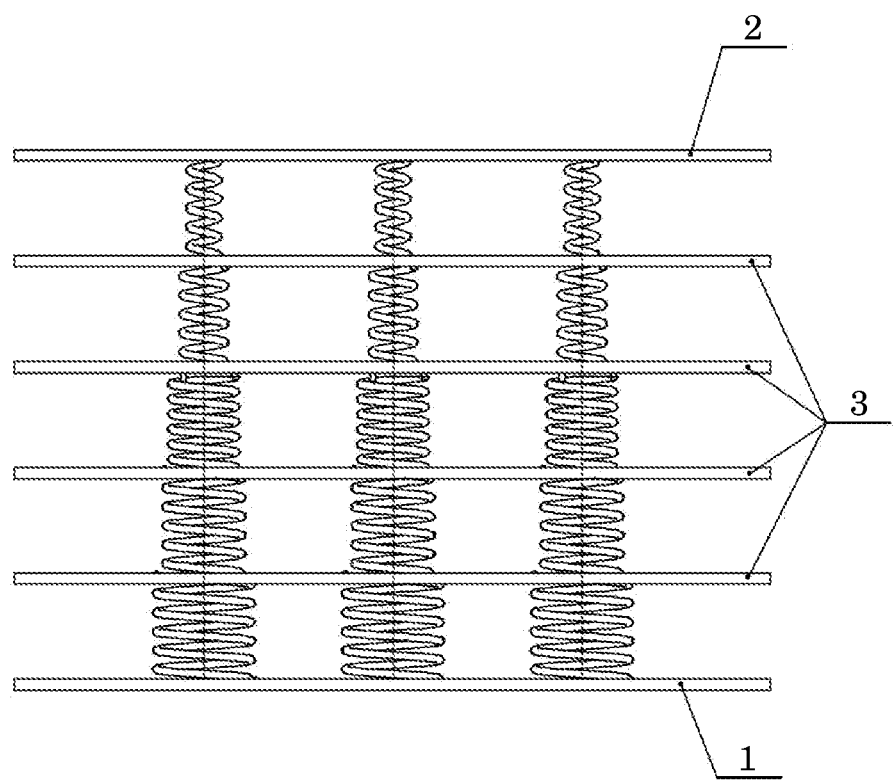
FIG. 11. Schematic representation of 5-chamber progressive Automobile Collision Impact Reducer.

As shown in FIG. 11, there are 5 chambers. in progressive arrangement of springs in 5 chambered device with outer box 2, middle plates 3 and inner box 1 attaching these springs, first chamber in outer portion is having low stiff springs amongst all, and the strength/stiffness of springs in the chambers will increase progressively up to the 5th chamber.

During collision, first impact will be absorbed by the cushioning materials. Then the 1st chamber having least stiff springs will get the remaining impact force from the cushioning materials and it will compress first as it comprises of least stiff springs. After that the remaining force will get transferred to the 2nd chamber having more stiffness than the first chamber springs, since it's stiffness is lower than third, 4th and 5th chambers, it will compress and transfer the remaining force to the 3rd chamber and compress and similarly the transfer of forces to 4th chamber happens followed by fifth chamber after compression of 4th chamber and lastly 5th chamber(inner most) springs compress. The sequence will be repeated for number times until the complete compression occurs. During collision, the compression sequence also will be from 1st chamber to 5th chamber, that is from least stiff to most stiff; Whole unit comprising of chambers will attain the complete compression after several similar steps involving the same sequence of waves like compression with lesser compression force in each time increase the time gap to attain the complete compression of the entire device compared to single chambered device, which inturn reduces the impact of collision and can be placed in medium and heavy vehicles. So if the number of chambers increase more than 5, it can reduce the collision to a large extent. This figure is a schematic diagram to describe only the variants of compressive springs according to strength in progressive manner with plates 3, outer box 2, inner box 1, springs of different strengths without showing other components.

Figure 12:
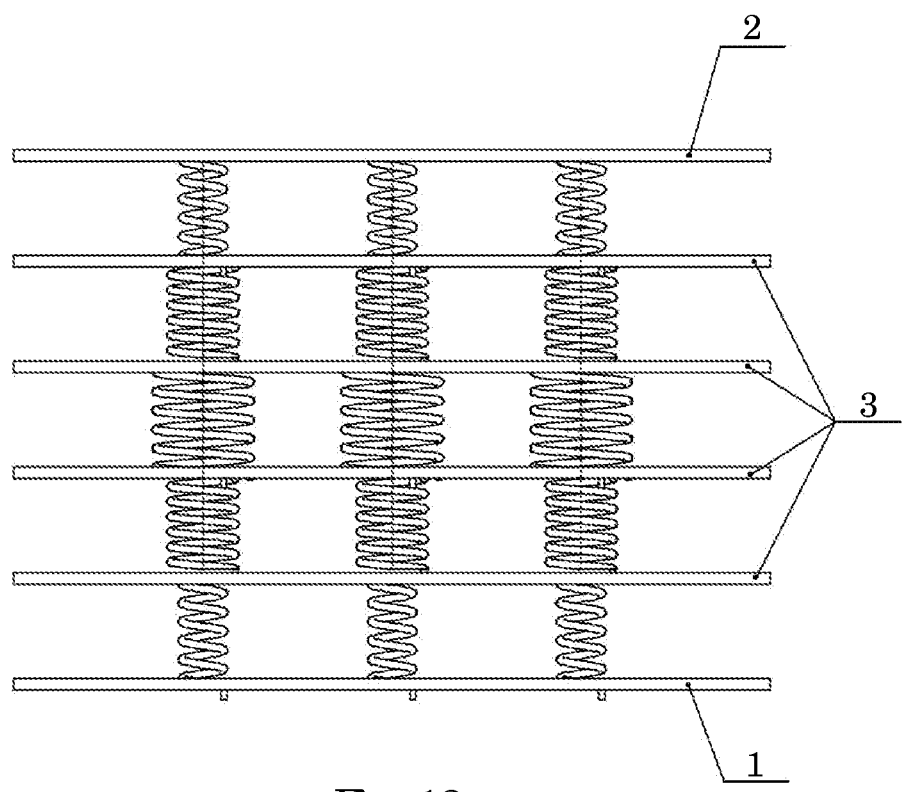
FIG. 12. Schematic representation of 5-chamber progressive Automobile Collision Impact Reducer.

In this FIG. 12, in case of symmetric arrangement of springs, Ist (outer most chamber) and 5th (inner most chamber) will be having low stiff springs 4, 2nd and 4th chambers will be having medium stiff springs 5 and 3rd chamber will be having high stiff springs 6 with outer box 2, middle plates 3 and inner box 1 attaching these springs.

During collision, first impact will be absorbed by the cushioning materials. After that the remaining impact force gets transferred to the least stiff springs in the outer/1st chamber and the compression begins from 1st chamber, then reduced force gets transferred to 5th chamber having least stiff springs identical to outer/1st chamber and then the 5th chamber will get compressed secondly and it will transfer the remaining force to 4th which is having medium stiff springs and it will get compressed, then from 4th, the force will transfer to 3rd chamber but since the 3rd chamber is having stiffest springs amongst all, it won't get compressed, but it transfers the remaining reduced force to 2nd chamber having medium stiff springs, 2nd chamber gets compressed and finally only the 3rd chamber gets compressed. Whole unit comprising of chambers will attain the complete compression after several similar steps involving the same sequence of waves like compression with lesser compression force in each time increase the time gap to attain the complete compression of the entire device compared to single chambered device and shifting of force from one chamber to another takes place in a greater time period in symmetric pattern than progressive pattern; So the time required to complete the compression will be higher in this type than progressive 5 chambered; therefore, the efficiency is also higher in this type. So if the number of chambers increases more than 5, it can reduce the collision to a large extent. This figure is a schematic diagram to describe only the variants of compressive springs according to strength in symmetrical manner with plates 3, outer box 2, inner box 1 without showing other components.

Figure 13:
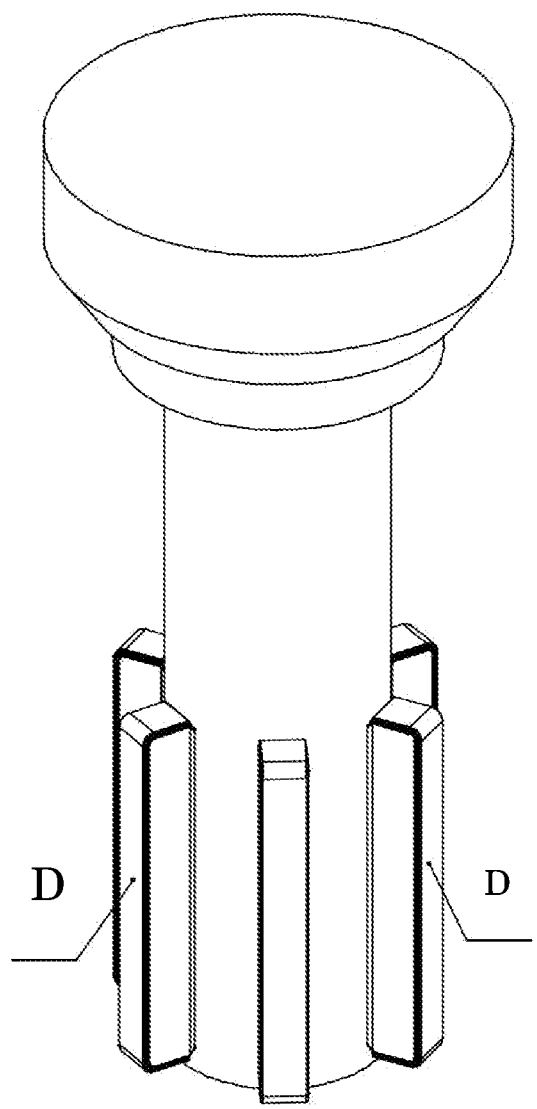
FIG. 13. Schematic representation of Position of Automobile Collision Impact Reducer in pillar of bridge.

As shown in FIG. 13, ACIR is incorporated without recoil locking system, crash sensors of air bag, cushioning materials into pillars of bridges, near to the roads where the probability of collision is high. It can be positioned vertically/horizontally around the pillar depending on the shape of the pillar and depending on the safety plan.

Figure 14:
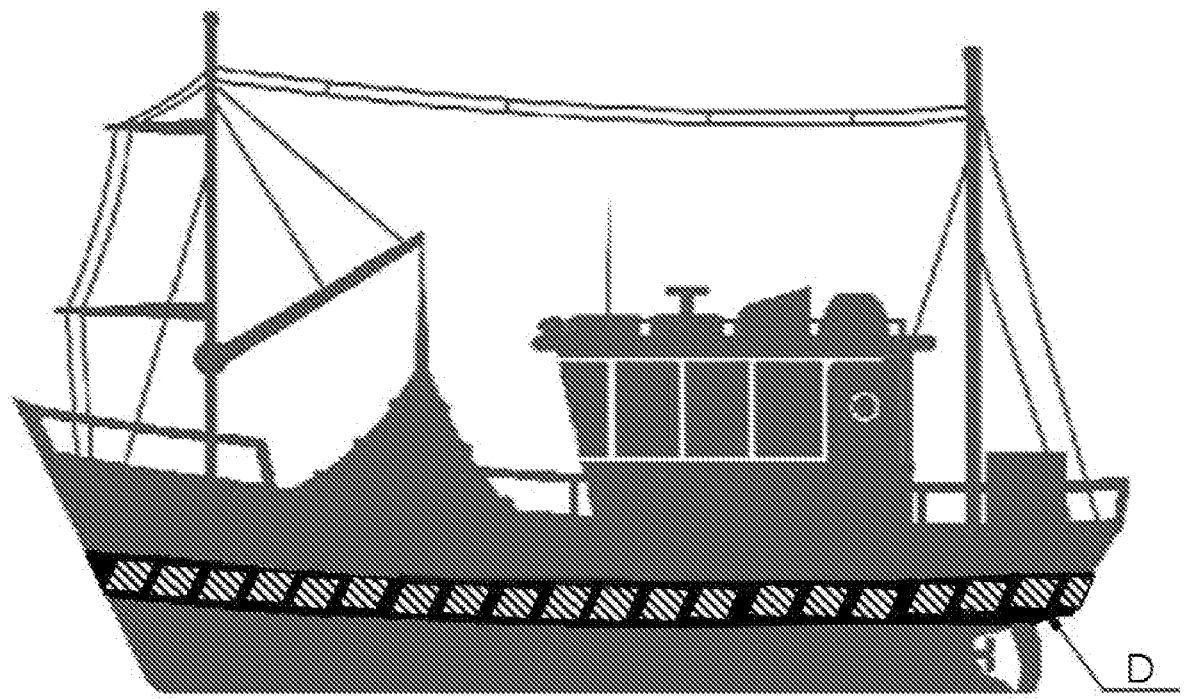
FIG. 14. Schematic representation of Position of Automobile Collision Impact Reducer in boat and boat-jetties.
Figure 14:
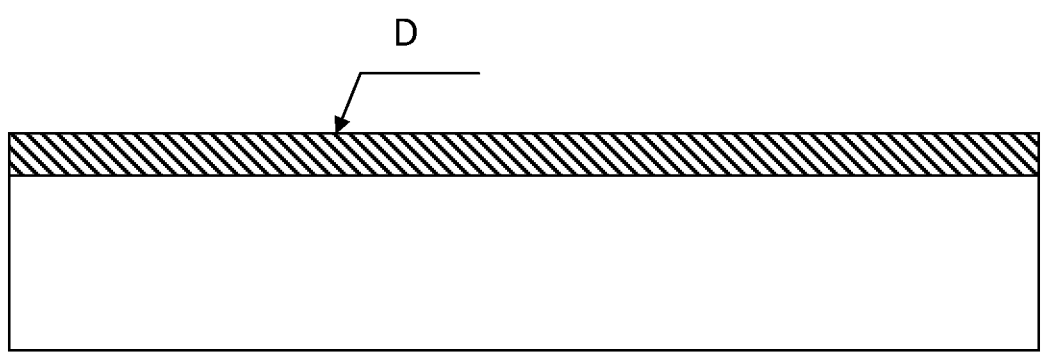

As shown in FIG. 14, ACIR is incorporated into boats and boat jetties (a schematic representation is given, where the probability of collision is high without recoil locking system, crash sensors of air bag and multilayered cushioning materials. Due to the wavy nature of boats, the device is placed intermittently. In boat jetties, we can place it continuously if possible.

I claim:

1. A collision impact reducer having a multi-layered cushioning, comprising:
    a plurality of gas-water bags adjacent to each other;
    wherein each gas-water bag, has a portion containing nitrogen gas and a separate portion containing water.
2. The collision impact reducer as claimed in claim 1, the collision impact reducer has at least one recoil-locking system.
3. The collision impact reducer as claimed in claim 1,
    the collision impact reducer has one or more plates, wherein the plates divide the collision impact reducer into a plurality of chambers; and
    each said chamber comprises one or more springs.
4. The collision impact reducer as claimed in claim 1, wherein:
    the multi-layered cushioning covers an entire length of the collision impact reducer and a small portion extends sideways.
5. The collision impact reducer as claimed in claim 1, wherein:
    the multi-layered cushioning, further has one or more layers of rubber sheet.
6. The collision impact reducer as claimed in claim 1, wherein:
    the multi-layered cushioning, further has one or more layers of polystyrene.
7. The collision impact reducer as claimed in claim 1, wherein:
    the multi-layered cushioning, further has a plastic overlay which is placed over the plurality of gas-water bags.
8. The collision impact reducer as claimed in claim 1, wherein:
    the gas-water bags are placed at an extreme front region of the multi-layered cushioning.
9. The collision impact reducer as claimed in claim 1, wherein:
    the gas-water bags have wings.
10. The collision impact reducer as claimed in claim 2, wherein each recoil-locking system further comprises:
    a recoil arrester plate; and
    a recoil locking lever.
11. The collision impact reducer as claimed in claim 10, wherein:
    a length of plane structure of the recoil arrester plate is equal to a width of the collision impact reducer, excluding a width of the multi-layered cushioning, when in a completely compressed state.
12. The collision impact reducer as claimed in claim 10, wherein:
    one end of the recoil locking lever, is fixed using a nut and has free tilting movement.
13. The collision impact reducer as claimed in claim 10, wherein the recoil arrester plate further comprises:
    a teethed structure, wherein the teethed structure gets locked by the recoil locking lever.
14. The collision impact reducer as claimed in claim 10, further comprises:
    a tension spring attached to the recoil locking lever, wherein the lever is pulled towards the recoil arrester plate by the tension spring.
15. The collision impact reducer as claimed in claim 14, further comprises:
    a releasing knob, which is configured to change the recoil arrester plate from a compressed position to a normal position;
    wherein the releasing knob lifts the lever away from the recoil arrester plate.
16. The collision impact reducer as claimed in claim 15, further comprises:
    a recoil locking box, for holding the tension spring, the releasing knob and the recoil locking lever.
17. The collision impact reducer as claimed in claim 15, wherein:
    the releasing knob is attached to the recoil locking lever.

18. The collision impact reducer as claimed in claim 2, further comprises:
- one or more plates, wherein the plates divide the collision impact reducer into a plurality of chambers; and
- each said chamber comprises one or more springs.

19. The collision impact reducer as claimed in claim 18, further comprises:
- one or more pipe pair, formed by one inner pipe and one outer pipe;
- wherein at least a portion of the inner pipe is inside the outer pipe.

20. The collision impact reducer as claimed in claim 2, further comprises:
- one or more pipe pair, formed by one inner pipe and one outer pipe;
- wherein at least a portion of the inner pipe is inside the outer pipe.

21. The collision impact reducer as claimed in claim 3, wherein:
- each of the one or more springs, are arranged perpendicularly to the plates.

22. The collision impact reducer as claimed in claim 3, wherein:
- the plurality of chambers has a progressive arrangement of the one or more springs, by having low stiffness springs of the one or more springs in a first chamber of the plurality of chambers and having increased stiffness springs of the one or more springs progressively towards a final chamber of the plurality of chambers.

23. The collision impact reducer as claimed in claim 3, wherein:
- the plurality of chambers has a symmetric arrangement of the one or more springs, by having identical low stiffness springs of the one or more springs in a first and a final chamber of the plurality of chambers, having increased stiffness springs of the one or more springs progressively from the first and the final chamber towards a middle chamber of the plurality of chambers, and with the middle chamber having highest stiffness springs of the one or more springs.

24. The collision impact reducer as claimed in claim 3, wherein:
- the springs are compression springs categorized based on thicknesses and strengths or stiffnesses; and
- these springs are placed in different chambers of the plurality of chambers.

25. The collision impact reducer as claimed in claim 3, further comprises:
- at least one recoil-locking system, each having a recoil arresting plate;
- wherein each chamber comprises at least a portion of the recoil arresting plate.

26. The collision impact reducer as claimed in claim 3, further comprises:
- one or more pipe pair, formed by one inner pipe and one outer pipe;
- wherein at least a portion of the inner pipe is inside the outer pipe; and
- each chamber comprises, at least a portion of the one or more pipe pair.

27. The collision impact reducer as claimed in claim 3, further comprises:
- one or more pipe pair, formed by one inner pipe and one outer pipe;
- wherein the one or more pipe pairs are arranged parallel to the springs.

28. The collision impact reducer as claimed in claim 1, wherein:
- the collision impact reducer, fixes to a vehicle chassis or a different surface which is prone to collision.

29. The collision impact reducer as claimed in claim 2, wherein:
- the collision impact reducer, fixes to a vehicle chassis or a different surface which is prone to collision.

30. The collision impact reducer as claimed in claim 3, wherein:
- the collision impact reducer, fixes to a vehicle chassis or a different surface which is prone to collision.

31. The collision impact reducer as claimed in claim 1, further comprises:
- one or more crash sensors, wherein the crash sensors are connected to a control unit of an air bag system.

32. The collision impact reducer as claimed in claim 2, further comprises:
- one or more crash sensors, wherein the crash sensors are connected to a control unit of an air bag system.

33. The collision impact reducer as claimed in claim 3, further comprises:
- one or more crash sensors, wherein the crash sensors are connected to a control unit of an air bag system.

34. The collision impact reducer as claimed in claim 1, further comprises:
- one or more inner case;
- one or more outer case;
- wherein at least portion of the inner case is inside the outer case.

35. The collision impact reducer as claimed in claim 2, further comprises:
- one or more inner case;
- one or more outer case;
- wherein at least portion of the inner case is inside the outer case.

36. The collision impact reducer as claimed in claim 3, further comprises:
- one or more inner case;
- one or more outer case;
- wherein at least a portion of the inner case is inside the outer case.

37. The collision impact reducer as claimed in claim 1 comprises:
- one pipe pair;
- one recoil locking system; and
- one or more springs.

* * * * *